Figure 1:
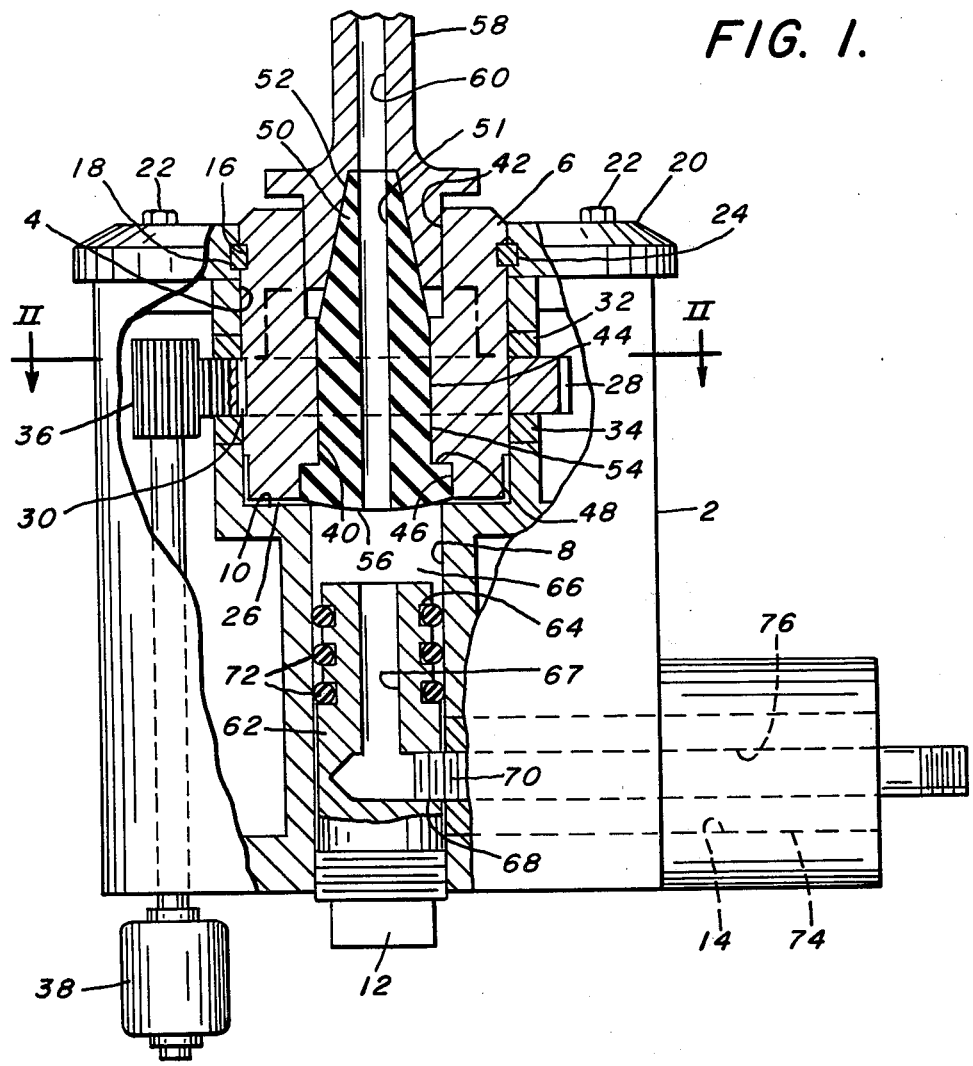

United States Patent [19]
Martino et al.

[11] 3,985,367
[45] Oct. 12, 1976

[54] WET DRILLING SYSTEM

[75] Inventors: Eugene J. Martino, Price, Utah; Irvin W. Walker, Bridgeport, W. Va.

[73] Assignee: Carmet Company, Pittsburgh, Pa.

[22] Filed: Aug. 15, 1975

[21] Appl. No.: 604,980

[52] U.S. Cl. .............................. 279/20; 175/214; 279/1 Q; 408/59
[51] Int. Cl.[2] ........................................ B23B 51/06
[58] Field of Search ................... 279/1 Q, 4, 20; 408/57–59; 175/212, 214

[56] References Cited
UNITED STATES PATENTS

| | | | |
|---|---|---|---|
| 2,683,040 | 7/1954 | Graham | 279/4 |
| 2,880,007 | 3/1959 | Stoner | 279/1 Q X |
| 2,955,830 | 10/1960 | Vilter | 279/1 Q X |
| 3,024,030 | 3/1962 | Koch | 279/20 |
| 3,561,299 | 2/1971 | Brisk et al | 408/59 |
| 3,791,660 | 2/1974 | Bostley | 279/20 |
| 3,817,648 | 6/1974 | Miller | 408/59 |

*Primary Examiner*—Othell M. Simpson
*Assistant Examiner*—Fred A. Silverberg
*Attorney, Agent, or Firm*—Vincent G. Gioia; Robert F. Dropkin

[57] ABSTRACT

Apparatus for underground drilling includes a housing having a bottomed opening in its top and a hole extending downwardly through the housing from the opening. A rotatable chuck is received in the opening and has a vertical bore therethrough with non-circular upper portion for receiving a hollow drill rod, an intermediate portion and an enlarged lower portion having a shoulder at the top thereof. A compressible plug is closely received in the vertical bore and has an enlarged bottom portion with its top bearing against the shoulder and its bottom bearing against the bottom of the chuck bore. The plug has a frusto-conical upper portion which is compressed by the bottom of the hollow drill rod. A hollow adapter is received in the hole in the housing in spaced relationship with the chuck and has sealing engagement with the hole wall. Water is fed into the hollow adapter and passes therethrough into an axial hole in the plug and then through the hollow drill rod where it is discharged to lubricate the drill and pick up the dust.

6 Claims, 2 Drawing Figures

WET DRILLING SYSTEM

This invention relates to wet drilling and more particularly to drilling underground in a coal mine or the like. A principle use is drilling holes in the mine roof for receiving roof bolts. To the best of our knowledge the drilling in the past has been dry with a vacuum being used to suck the dust through a hole in the drill rod. This has many disadvantages from both operating and safety viewpoints. It is impossible to collect all the dust during the drilling operation so a considerable amount of the dust remains in the air and a portion also remains on the walls of the hole. Thus the hole is relatively non-uniform and its wall is not too solid. This results, at least in some instances, in a relatively weak connection of the roof bolt in the hole. Wear of the drill rod also is excessive because of the abrasive action of the dust. It is necessary for the operator to stop drilling from time to time to remove the dust container and empty it. This is normally done by dumping the dust on the floor where currents of air will pick up a substantial portion thereof and circulate it. It has been well known for a long time that dust in the air is a principle cause of black lung and mine explosions. In spite of the fact that water is readily available in most mines wet drilling, to the best of our knowledge, has not been used successfully in mines. We are aware that wet drilling has been tried, but has not been successful for various reasons.

It is therefore an object of our invention to provide apparatus for wet drilling of holes underground.

Another object is to provide such apparatus which results in increased drill rod or bit life than present drilling apparatus.

A further object is to provide such apparatus which produces a cleaner and more uniform hole than previously obtained.

A still further object is to provide such apparatus which greatly reduces the amount of dust in the air.

Still another object is to provide such apparatus which is cheaper to operate than present dry drills.

Yet another object is to provide such apparatus which may be readily adapted for use in dry drilling.

Figure 2:
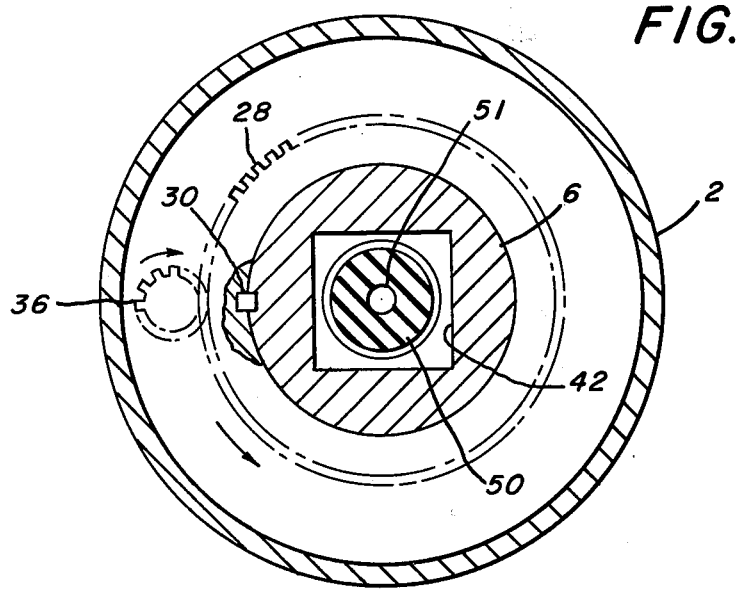

FIG. 1 is an elevation, partly in section, of the apparatus of our invention; and FIG. 2 is a sectional view taken on line II—II of FIG. 1.

Referring more particularly to the drawings, reference numeral 2 indicates a drill head housing. This may be a part of a Fletcher Mast-Feed Rotary Drill as manufactured and sold by J. H. Fletcher and Co., Box 2143, Huntington, West Virginia 25722. An opening 4 is provided in the upper part of housing 2 for receiving a rotatable chuck 6. A reduced diameter hole 8 extends from bottom 10 of opening 4 to the bottom of housing 2. The lower end of hole 8 is threaded to receive a threaded plug 12. A side opening 14 communicates with hole 8. The chuck 6 has a peripheral groove 16 therein above the top of housing 2 which communicates with a similar groove 18 in a housing cover 20 which is fastened to housing 2 by means of bolts 22. A split ring 24 in grooves 16 and 18 holds the chuck in position with a slight space 26 between its bottom and bottom 10. A driven gear 28 surrounds chuck 6 and is keyed thereto by means of key 30. The gear 28 is held in position between upper and lower thrust bearings 32 and 34. The gear 28 is driven by means of gear 36. An electric motor 38 drives gear 36. The parts so far described are essentially as present in the Fletcher drill.

According to our invention a vertical bore 40 is provided in chuck 6. This bore 40 includes a square upper portion 42 having a bottom shoulder, an intermediate portion 44, and a lower enlarged diameter portion 46 with a shoulder 48 between portion 44 and 46. A compressible water plug 50, preferably made of rubber, and having an axial hole 51 therethrough, is received in bore 40. The plug 50 has an inwardly and upwardly frusto-conical or tapered upper portion 52, a cylindrical intermediate portion 54, and an enlarged diameter lower portion 56 having an arcuate convex bottom. The ends of plug 50 extend beyond the chuck 6. A drill rod 58 having an opening 60 therethrough is received in the square portion 42 of the chuck and has a tapered lower end for receiving upper portion 52 of the plug.

A steel adaptor 62 having a plurality of peripheral grooves 64 therein is received in hole 8 with a space 66 thereabove. The adaptor 62 has a vertical hole 67 therethrough. A transverse threaded hole 68 is provided adjacent the bottom of adaptor 62 for receiving one end of a nipple 70. A rubber O-ring 72 is positioned in each groove 64. A sleeve 74 is press fit into opening 14 and has an axial hole 76 therethrough for receiving nipple 70.

With the plug 50, adaptor 62, sleeve 74 and nipple 70 removed, the drill can be used as in the past by connecting a suction means to opening 14.

To assemble the parts for use in wet drilling, the plug 12 is removed and the adaptor 62 with O-rings 72 in place is placed in hole 8 and the plug 12 then threaded into the hole 8. Sleeve 74 is pressed into place and the nipple 70 is passed through hole 76 and threaded into the adaptor 62. The housing cap 20 and chuck 6 are removed and the compressible plug 50 is forced into bore 40 with its enlarged lower portion 56 bearing against shoulder 48. This is a very close fit and the chuck 6 and plug 50 will rotate in unison. The assembled chuck 6 and plug 50 are then replaced in the chuck opening 4 and the cap 20 replaced. It will be seen that the plug 50 is compressed against the bottom 10 of opening 4, particularly around the top of hole 8, to provide an effective water seal. A drill rod 58 is then placed in the square upper portion 42 of bore 40 with the wall of its hole at its lower end compressing at least a portion of the tapered upper portion 52 of plug 50 to provide a water seal. The nipple 70 is then connected to a water source (not shown) and the drill is ready for use. It will be seen that the water passes through nipple 70, hole 67, space 66, hole 51 and opening 60 in drill rod 58 to the cutting edge thereof while being sealed from the rest of housing 2. The water exiting from the drill rod effectively lubricates the cutting edge and receives the dust formed during drilling. The water with the dust and/or cuttings therein flows over the floor to the water sump which is usually provided for mine drainage. Thus, there is little or no dust in the air or present on the floor of the mine.

While one embodiment has been shown and described, it will readily apparent to those skilled in the art that various adaptations and modifications may be made within the scope of the invention.

We claim:

1. Apparatus for underground drilling comprising a housing, an opening in the top of said housing having a bottom therein, a rotatable chuck received in said opening, a vertical bore through said chuck having a non-circular upper portion for receiving a hollow drill rod, a compressible water plug closely received in said chuck bore, said plug having a vertical hole therethrough, a bottom portion bearing against the bottom of said housing opening and a top portion tapering inwardly and upwardly with a portion thereof being adapted to be compressed by the bottom of a drill rod received in said chuck, and means for supplying water to the bottom of said bore.

2. Apparatus for underground drilling according to claim 1 in which said means for supplying water to the bottom of said bore includes a hole in said housing aligned with and below said bore and extending through the bottom of said housing, a plug in said hole closing the bottom thereof, an adapter in said hole extending from a position above said plug to a distance below said chuck, said adapter having water sealing means in engagement with the wall of said hole, a transverse threaded opening and an axial opening communicating with said threaded opening, and a nipple threaded into said threaded opening and extending to the outside of said housing.

3. Apparatus for underground drilling according to claim 2 including a sleeve surrounding said nipple, and an opening in said housing for receiving said sleeve.

4. Apparatus for underground drilling according to claim 1 in which the bottom of said chuck is spaced from the bottom of said opening, said vertical bore has an enlarged bottom portion with a shoulder at its upper end, and the bottom portion of said plug is enlarged with the top of the enlarged portion bearing against said shoulder and its bottom extending below the bottom of said chuck.

5. Apparatus for underground drilling according to claim 4 in which said means for supplying water to the bottom of said bore includes a hole in said housing aligned with and below said bore and extending through the bottom of said housing, a plug in said hole closing the bottom thereof, an adapter in said hole extending from a position above said plug to a distance below said chuck, said adapter having water sealing means in engagement with the wall of said hole, a transverse threaded opening and an axial opening communicating with said threaded opening, and a nipple threaded into said threaded opening and extending to the outside of said housing.

6. Apparatus for underground drilling according to claim 5 including a sleeve surrounding said nipple, and an opening in said housing for receiving said sleeve.

* * * * *